(12) United States Patent
Belzile

(10) Patent No.: US 11,588,363 B2
(45) Date of Patent: Feb. 21, 2023

(54) INTEGRATED ELECTRIC PROPULSION ASSEMBLY

(71) Applicant: BETA AIR, LLC, South Burlington, VT (US)

(72) Inventor: Manon Danielle Belzile, Fairfield, VT (US)

(73) Assignee: BETA AIR, LLC, South Burlington, VT (US)

( * ) Notice: Subject to any disclaimer, the term of this patent is extended or adjusted under 35 U.S.C. 154(b) by 326 days.

(21) Appl. No.: 16/938,952

(22) Filed: Jul. 25, 2020

(65) Prior Publication Data
US 2022/0029488 A1 Jan. 27, 2022

(51) Int. Cl.
*H02K 3/04* (2006.01)
*B64D 27/24* (2006.01)
*H02K 1/27* (2022.01)
*H02K 1/12* (2006.01)
*H02K 11/30* (2016.01)

(52) U.S. Cl.
CPC ............... *H02K 3/04* (2013.01); *B64D 27/24* (2013.01); *H02K 1/12* (2013.01); *H02K 1/27* (2013.01); *H02K 11/30* (2016.01)

(58) Field of Classification Search
CPC . B64D 27/24; H02K 1/12; H02K 1/27; H02K 11/30; H02K 3/04; H02K 3/32; H02K 3/34
USPC ...................... 310/49.02, 68 D, 89, 164, 208
See application file for complete search history.

(56) References Cited

U.S. PATENT DOCUMENTS

| | | | | |
|---|---|---|---|---|
| 4,563,606 A | * | 1/1986 | Fukasawa | H02K 3/46 310/216.115 |
| 4,968,911 A | * | 11/1990 | Denk | H02K 3/47 310/179 |
| 5,030,877 A | * | 7/1991 | Denk | H02K 3/47 290/52 |
| 5,304,883 A | | 4/1994 | Denk | |
| 6,552,463 B2 | | 4/2003 | Oohashi et al. | |

(Continued)

FOREIGN PATENT DOCUMENTS

| | | |
|---|---|---|
| DE | 4404585 A1 | 8/1995 |
| EP | 0942512 A1 | 9/1999 |

(Continued)

*Primary Examiner* — Rashad H Johnson
(74) *Attorney, Agent, or Firm* — Caldwell Intellectual Property Law

(57) ABSTRACT

An integrated stator assembly incorporated in an electric motor including a rotor that includes a plurality of rotor magnets, each rotor magnet of the plurality of magnets having a polar axis running from a rotor magnet south pole to a rotor magnet north pole. The assembly comprising a mandrel of dielectric material, wherein the mandrel includes a first cylindrical surface coaxial to an axis of rotation of the rotor, an upper edge, and a lower edge. A plurality of electrically conductive stator windings wound upon the mandrel, each winding of the plurality of windings including a plurality of turns traversing the first cylindrical surface, wherein each turn of the plurality turns further comprises a first upper section disposed on the first cylindrical surface, wherein the first upper section intersects the upper edge of the mandrel, and the first upper section forms a first angle to the axis of rotation.

20 Claims, 13 Drawing Sheets

(56) References Cited

U.S. PATENT DOCUMENTS

| | | | | |
|---|---|---|---|---|
| 6,873,085 | B2* | 3/2005 | Graham | H02K 3/47 |
| | | | | 310/156.08 |
| 6,924,574 | B2* | 8/2005 | Qu | H02K 21/12 |
| | | | | 310/112 |
| 7,780,108 | B2 | 8/2010 | Lyschick et al. | |
| 9,130,431 | B2 | 9/2015 | Seguchi et al. | |
| 10,239,154 | B2 | 3/2019 | Ciampolini et al. | |
| 2009/0278647 | A1 | 11/2009 | Buswell | |
| 2012/0086296 | A1* | 4/2012 | Cleveland | H02K 15/0414 |
| | | | | 310/179 |
| 2016/0380496 | A1* | 12/2016 | Hunstable | H02K 21/26 |
| | | | | 310/179 |
| 2017/0222494 | A1* | 8/2017 | Hunstable | H02K 3/18 |
| 2019/0199185 | A1* | 6/2019 | Hunstable | H02K 21/44 |
| 2019/0280550 | A1* | 9/2019 | Kay | H02K 1/17 |
| 2019/0288571 | A1* | 9/2019 | Lehikoinen | B64D 27/24 |
| 2020/0185997 | A1* | 6/2020 | Hirasawa | H02K 15/0062 |
| 2020/0328639 | A1* | 10/2020 | Takahashi | H02K 1/2786 |
| 2020/0403467 | A1* | 12/2020 | Takahashi | H02K 7/14 |
| 2020/0403468 | A1* | 12/2020 | Takahashi | H02K 1/2766 |
| 2021/0344255 | A1* | 11/2021 | Said | H02K 11/33 |
| 2021/0384789 | A1* | 12/2021 | Mawatari | H02K 9/19 |
| 2021/0384794 | A1* | 12/2021 | Tamura | H02K 3/522 |
| 2022/0006339 | A1* | 1/2022 | Takahashi | H02K 13/006 |
| 2022/0006340 | A1* | 1/2022 | Hunstable | H02K 1/02 |
| 2022/0021249 | A1* | 1/2022 | Takahashi | H02K 1/04 |
| 2022/0021267 | A1* | 1/2022 | Takahashi | H02K 5/203 |
| 2022/0029488 | A1* | 1/2022 | Belzile | H02K 1/27 |
| 2022/0045559 | A1* | 2/2022 | Hunstable | H02K 21/24 |
| 2022/0181930 | A1* | 6/2022 | Tsuchiya | H02K 1/2792 |
| 2022/0181935 | A1* | 6/2022 | Tamura | H02K 3/28 |
| 2022/0200421 | A1* | 6/2022 | Takahashi | H02K 1/27915 |
| 2022/0224179 | A1* | 7/2022 | Lin | H02K 3/50 |
| 2022/0231561 | A1* | 7/2022 | Lin | H02K 3/02 |

FOREIGN PATENT DOCUMENTS

| | | |
|---|---|---|
| FR | 2535924 A1 | 5/1984 |
| WO | WO1989005538 | 6/1989 |

\* cited by examiner

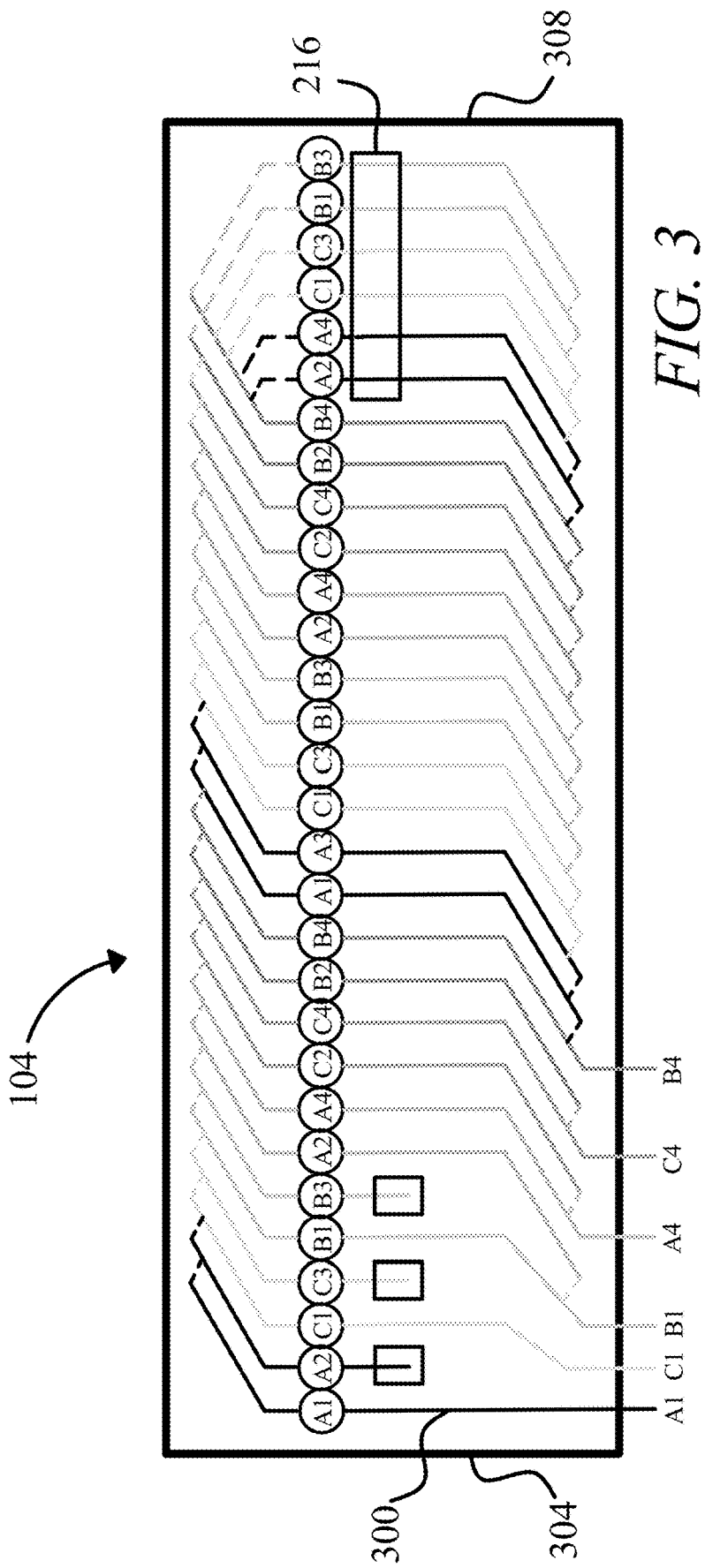

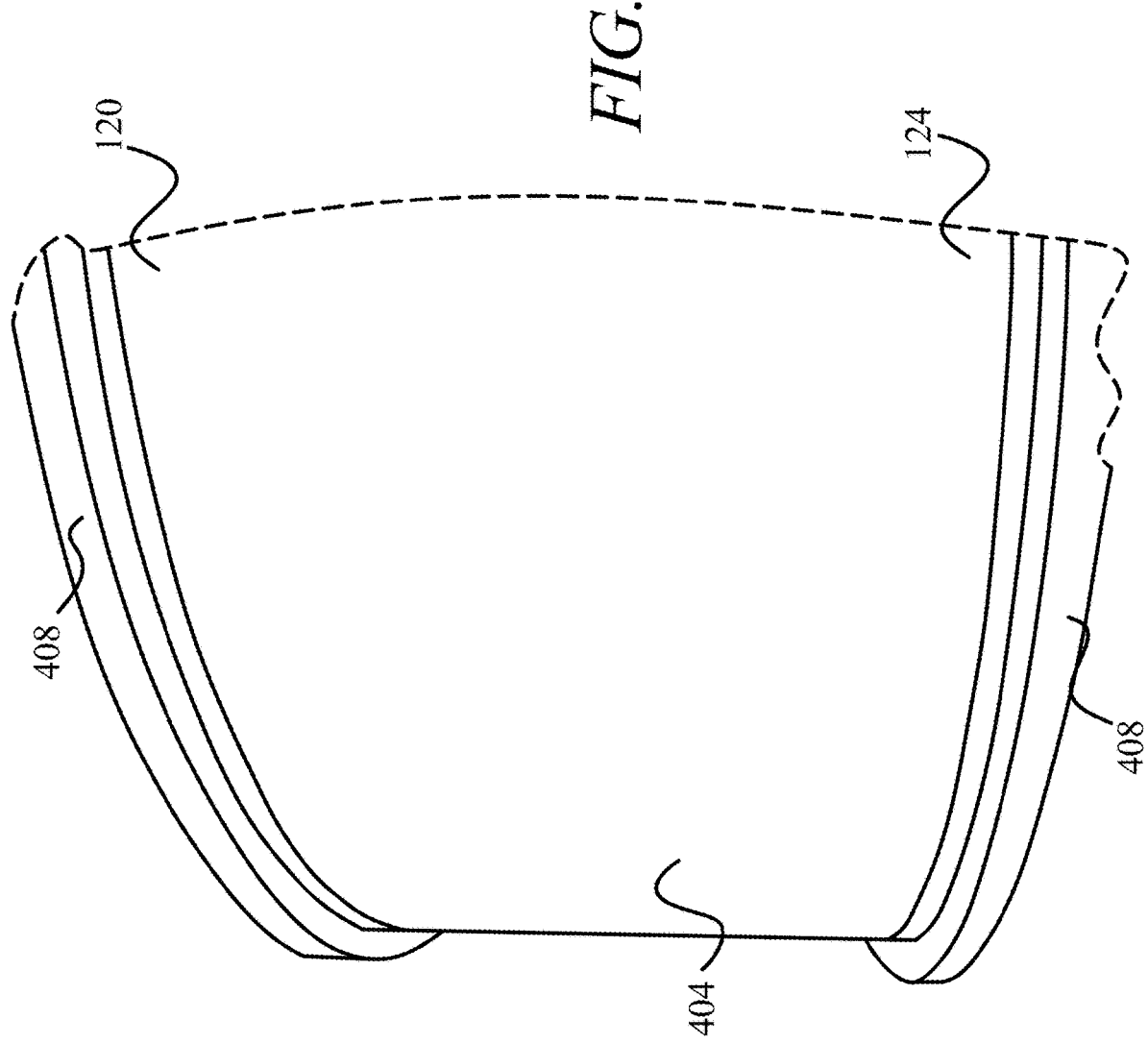

INTEGRATED ELECTRIC PROPULSION ASSEMBLY

FIELD OF INVENTION

The present invention generally relates to the field of electric aircraft propulsion assemblies. In particular, the present invention is directed to an integrated electric propulsion assembly.

BACKGROUND

In electric multi-propulsion systems such as electric vertical take-off and landing (eVTOL) aircraft, the propulsors are constrained by volumetric, gravimetric and thermal concerns. Design and assembly of the propulsor units must be done in a manner which reduces volumetric, gravimetric and thermal issues to enable efficient flight. Existing approaches to mitigating these issues are limited.

SUMMARY OF THE DISCLOSURE

In an aspect, a stator assembly includes a plurality of rotor magnets, wherein each rotor magnet of the plurality of magnets having a polar axis running from a rotor magnet south pole to a rotor magnet north pole. The assembly further comprises a mandrel of dielectric material, wherein the mandrel includes a first cylindrical surface coaxial to an axis of rotation of the rotor, an upper edge, and a lower edge. The assembly further comprises a plurality of electrically conductive stator windings wound upon the mandrel, each winding of the plurality of windings including a plurality of turns traversing the first cylindrical surface, wherein each turn of the plurality of turns further comprises a first upper section that intersects the upper edge of the mandrel, and the first upper section forms a first angle to the axis of rotation. The assembly further comprises a first lower section disposed on the first cylindrical surface, where the first lower section intersects the lower edge of the mandrel, and the first lower section forms a second angle to the axis of rotation. The assembly further comprises a middle section disposed on the first cylindrical surface, between the first upper section and the first lower section, wherein the first middle section forms a third angle with respect to the axis of rotation, and the third angle is perpendicular to each polar axis of each rotor magnet of the plurality of rotor magnets.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 is a schematic diagram of a plurality of windings on a mandrel segment;

FIG. 4B is an illustration of an embodiment a mandrel enclosure and connector rings;

Figure 1:
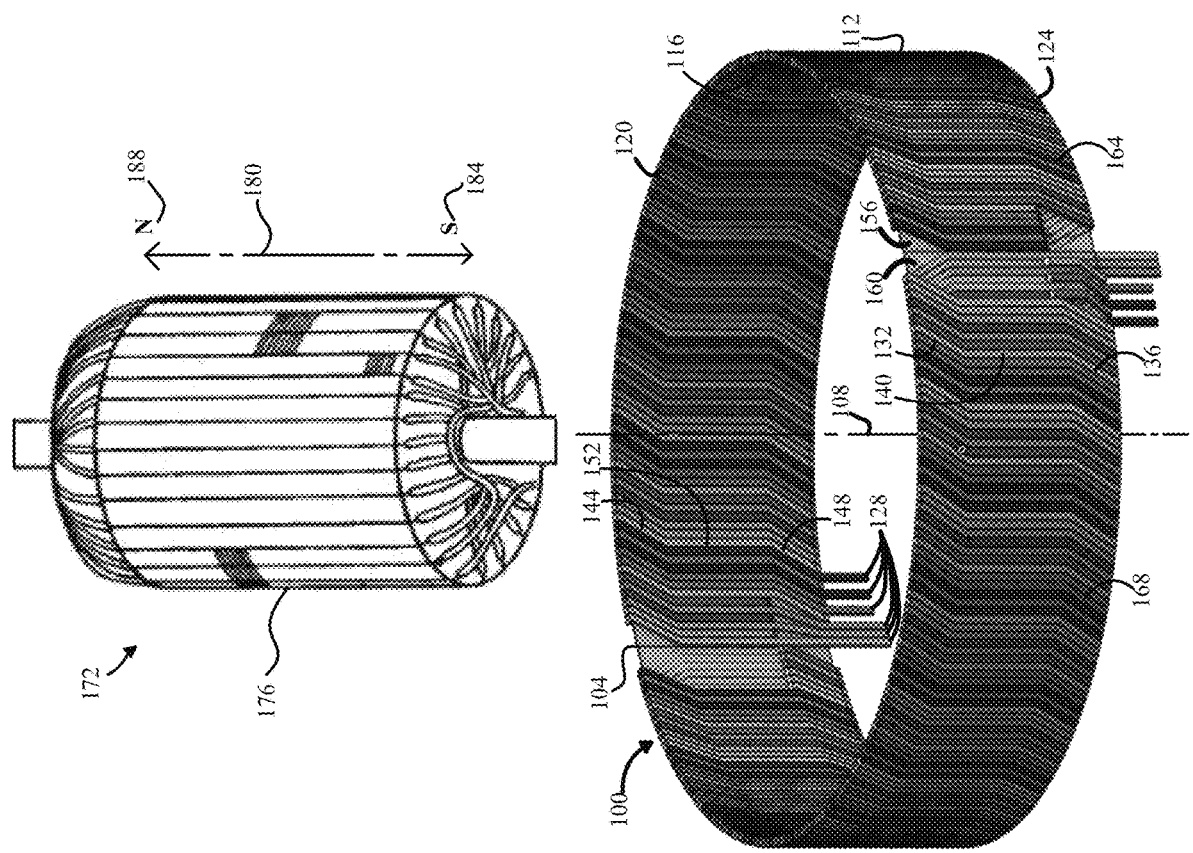
FIG. 1 is an illustration of an embodiment of a stator assembly, including mandrel and windings.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 5. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Embodiments of the system disclosed herein utilize integrated electric propulsion assemblies combining a rotor of an electric motor directly into a propulsor. Such assemblies may provide thrust in electric aircraft for situations such as takeoff, landing, hovering, or high-turbulence situations. The design of an integrated electric propulsion assembly offers benefits such as weight reduction. Additional benefits may include reduced drag from wind resistance, by avoiding a higher profile assembly, such as conventional assemblies mounting propulsors to motors by way of a collar or flange. Integrated electric propulsion assemblies may be enclosed in chambers in structural elements such as wings or outriggers of electric aircraft or other vehicles; in some embodiments, an integrated electric propulsion assembly may be used to reduce drag on the structural elements which reduces the demand on the energy source enabling longer flight times, especially in critical missions or in missions where the flight plans may be changed due to unforeseen environmental circumstances encountered during flight. In some embodiments, integrated electric propulsion assemblies may have elements which also function to cool internal components during flight. In another embodiment, an integrated electric propulsion assembly is integrated into one unit allowing for ease of installation, removal, maintenance or troubleshooting.

Referring now to FIG. 1, an embodiment of a stator assembly 100 that may be incorporated in an electric motor as described below is illustrated. For instance, and without limitation, stator assembly 100 may be incorporated in an electric motor including a rotor 172 that includes a plurality of rotor magnets 176, each rotor magnet of the plurality of magnets having a polar axis 180 running from a rotor magnet south pole 184 to a rotor magnet north pole 188, as described in further detail below. Stator assembly 100 may form a cylinder and/or hollow stator assembly 100 may include a mandrel 104, and an inward axis of rotation 108. Stator assembly 100 may include an outer cylindrical surface facing away from the axis of rotation and a inner cylindrical surface, opposite the outer cylindrical surface, facing inwards towards an axis of rotation 108. Similarly, a mandrel 104 may include a first cylindrical surface 112, a second cylindrical surface 116 opposite a first cylindrical surface 112, an upper edge 120, and a lower edge 124. In non-limiting illustrative embodiments, a second cylindrical surface 116 may have a first radius, and a first cylindrical surface 112 may have a second radius, which may be greater than the first radius, wherein a second cylindrical surface 116 is concentrically inserted in a first cylindrical surface 112 and both surfaces are coaxial to an axis of rotation 108.

Still referring to FIG. 1, mandrel 104 is composed of dielectric material. Dielectric material may include any material and/or combination of materials that acts as an electrical insulator; additionally, dielectric materials used herein may be any substance that is a relatively poor conductor of electricity but may support an electrostatic field. Dielectric material may include, without limitation, polymers or dielectric composites, amongst other materials. Persons skilled in the art, upon reviewing the entirety of this disclosure, will be aware of various forms of dielectric material that may be consistent with the described methods and systems.

With continued reference to FIG. 1, stator assembly 100 includes a plurality of windings 128 made of electrically conductive material wound upon mandrel 104. Electrically conductive material may include any material that is conductive to electrical current and may include, as a non-limiting example, various metals such as copper, steel, or aluminum, carbon conducting materials, or any other suitable conductive material. Persons skilled in the art, upon reviewing the entirety of this disclosure, will be aware of various forms of electrically conductive material that may be used as windings on a mandrel consistent with the described methods and systems. Each winding of plurality of windings 128 includes a plurality of turns. A turn as defined in this disclosure is a portion of a winding passing once around a mandrel or similar object, such as without limitation a portion that crosses a first surface of a mandrel, and then wraps around an edge, making an average angle that is an envelope of tangents to a first surface, and then crosses a second surface of a mandrel. Each turn of the plurality of turns may traverse each a cylindrical surface, traversal refers to a winding spanning a cylindrical surface from a lower edge 124 to an upper edge 120, or spanning from an upper edge 120 to a lower edge 124; traversal may refer to a winding covering any cylindrical surface between edges, and over edges. Persons skilled in the art, upon reviewing the entirety of this disclosure, will be aware of various methods of winding electrical windings on a mandrel that may be consistent with the described methods and systems. Each turn of a winding includes a first upper section 132 disposed on a first cylindrical surface 112. First upper section 132 intersects an upper edge 120 of a mandrel 104, where "intersecting" denotes that the first upper section 132 reaches the upper edge 120, at which point the winding crosses over onto another part of mandrel 104, forming a turn as described above. First upper section 132 forms a first angle to the axis of rotation 108, where the angle may include an average angle of an envelope of tangents to the first upper section 132, as described before. First upper section may, for instance be substantially diagonal, curved, or otherwise shaped, permitting subsequent turns to wrap around mandrel at positions advanced along a mandrel 104, for instance as described in further detail below. Each turn includes a first lower section 136 disposed on a first cylindrical surface 112. A first lower section 136 intersects a lower edge 124 of a mandrel 104, wherein the first lower section 136 forms a second angle to the axis of rotation 108, where an angle may be defined as described before. First middle section 140 is disposed on a first cylindrical surface 112, between a first upper section 132 and a first lower section 136. First middle section 140 forms a third angle with respect to the axis of rotation 108, and the third angle is perpendicular to a polar axis 180 of a rotor magnet of a plurality of rotor magnets 176. First middle section 140 has a perpendicular angle with respect to a polar axis 180 of a rotor magnet of a plurality of rotor magnets 176 may cause a magnetic field generated by a current through a first middle section 140 to exert a maximal degree of force on the rotor magnet of the plurality of rotor magnets 176, where "angle" is defined as noted above.

In non-limiting illustrative embodiments, and still referring to FIG. 1, mandrel 104 may include a second cylindrical surface 116 coaxial to the axis of rotation 108. A second cylindrical surface 116 may be opposite a first cylindrical surface 112. A plurality of windings 128 may be disposed on a second cylindrical surface 116; each winding may include a second upper section 144 intersects the upper edge 120 of the mandrel 104, and the second upper section 144 may form a fourth angle to the axis of rotation 108, as described above. A second lower section 148 of a plurality of windings 128 may be disposed on a second cylindrical surface 116, wherein the second lower section 148 intersects the lower edge 124 of a mandrel 104. Second lower section 136 may form a fifth angle to the axis of rotation 108, as described above. A second middle section 152 is disposed on a second cylindrical surface 116, between the second upper section 144 and the second lower section 148. Second middle section 152 may form a sixth angle with respect to the axis of rotation 108, wherein the sixth angle may be perpendicular to a polar axis 180 of a rotor magnet of a plurality of rotor magnets 176; where "angle" is defined as above. Second middle section 152 having a perpendicular angle with respect to a polar axis 180 of a rotor magnet may of a plurality of rotor magnets 176 cause a magnetic field generated by a current through the second middle section 152 to exert a maximal degree of force on a rotor magnet of a plurality of rotor magnets 176.

Still referring to FIG. 1, mandrel 104 may include a first half 156 having a first end and a second end, and a second half 160 having a third end and a fourth end. Alternatively, or additionally, a mandrel 104 may be composed of a single piece, and/or more than two pieces. In non-limiting illustrative embodiments, mandrel 104 may be composed of two halves, each with windings as described in this disclosure, and manufactured from dielectric material as described in this disclosure. Mandrel 104 having two halves may be assembled by having a first half 156 join a first end to a second half 160 third end, and a first half 156 join a second end to a second half 160 fourth end. Joining ends of mandrel halves may be accomplished as described in further detail below. A mandrel 104 first half 156 and second half 160 may each have a plurality of windings 128 channeled through a plurality of channels as described in further detail below. Mandrel 104 may be composed of any number of segments, each with a plurality of channels and a plurality of windings 128.

Figure 2A:
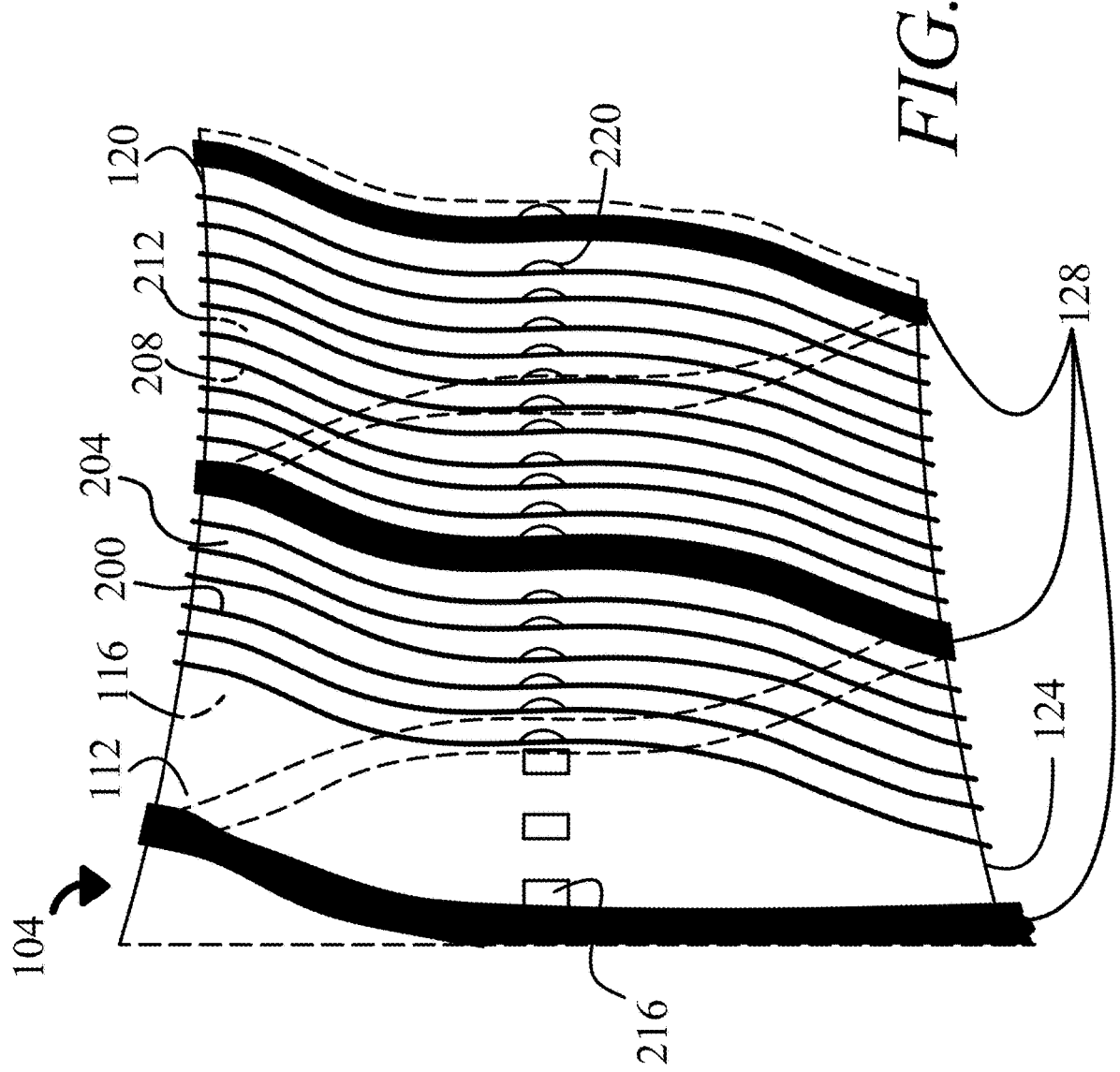
FIG. 2A is an illustration of an embodiment of a mandrel.

Referring to FIG. 2A, mandrel 104 may include a first plurality of walls 200 projecting from a first cylindrical surface 112. First plurality of walls 200 may form a first plurality of channels 204 may extend over an upper edge 120 and over a lower edge 124 to form a second plurality of walls 208 and a second plurality of channels 212 on a second cylindrical surface 116, opposite the first plurality of walls 200 and the first plurality of channels 204 on the first cylindrical surface 112. A plurality of windings 128 may be channeled in a first plurality of channels 204 on a first cylindrical surface 112, and a second plurality of channels 212 on a second cylindrical surface 116. Plurality of walls on the first cylindrical surface 112 and second cylindrical surface 116 are designed for securing the windings in the pattern describe before and are made of dielectric material for insulation between the windings, as described before. A mandrel 104 may include at least a mandrel through-hole 216 and/or a plurality of such through-holes, where a mandrel through-hole 216 may pass from a first cylindrical surface 112 to a second cylindrical surface 116. In non-limiting illustrative embodiments, mandrel through-hole 216 may connect a channel of a first plurality of channels 204 on a first cylindrical surface 112, to a channel of a second plurality of channels 212 on a second cylindrical surface 116. First cylindrical surface 112 and a second cylindrical surface 116 may have at least a plurality of retention tabs 220, extending perpendicularly from a plurality of walls, covering a section of a plurality of channels. Plurality of retention tabs 220 may function to keep a plurality of windings secured in the plurality of channels during the winding of a mandrel 104. Plurality of retention tabs 220 may extend orthogonally from plurality of walls forming the channels for a plurality of windings 128, and the plurality of retention tabs 220 may extend from the plurality of walls at any section and at more than one section. As further illustrated in FIG. 2, a turn of a plurality of windings 128 secured in a first plurality of channels 204 is shown in black on a first cylindrical surface 112 and in dashed lines on a second cylindrical surface 116.

Figure 2B:
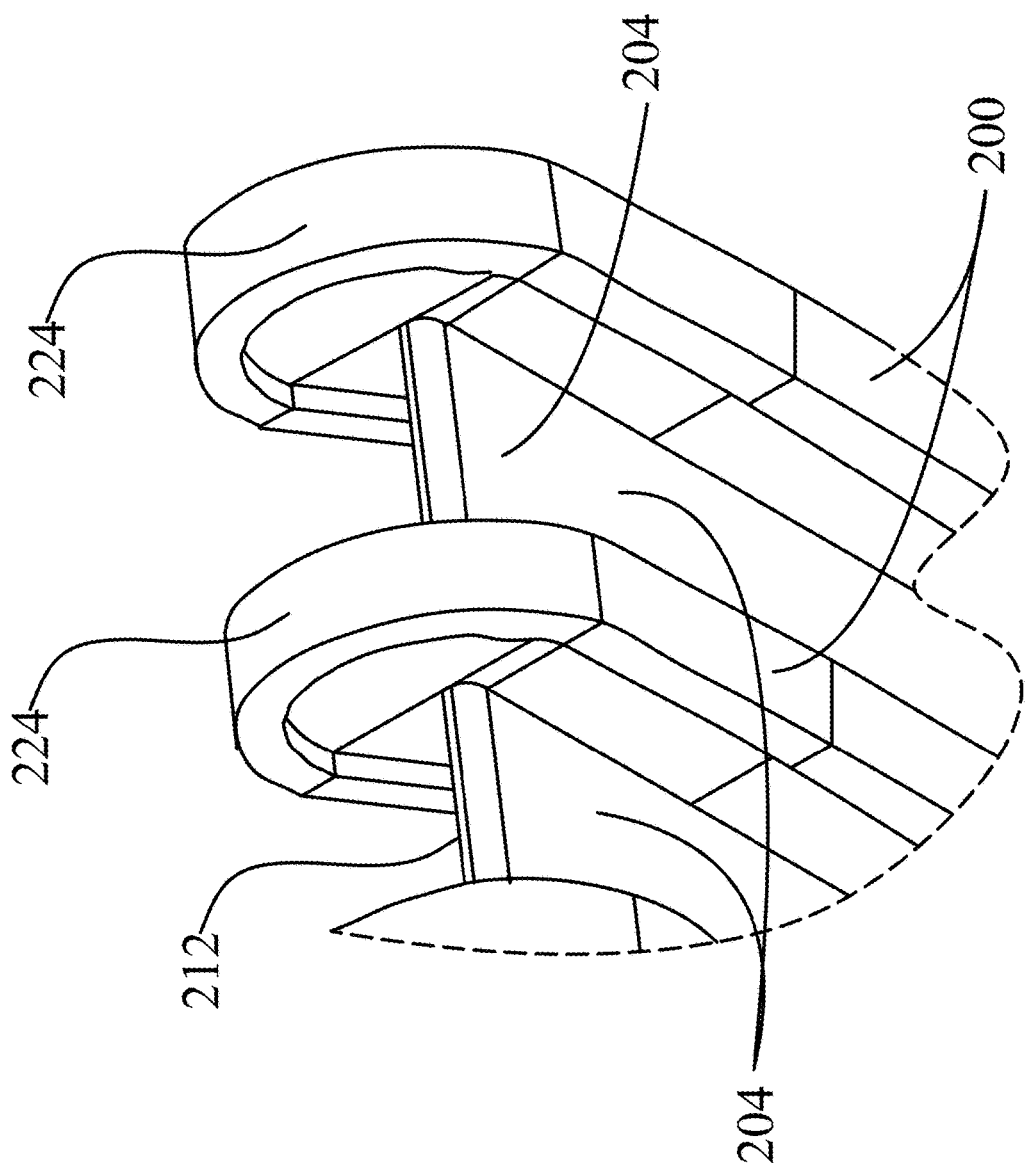
FIG. 2B is a close-up illustration of an embodiment of a mandrel.

Referring now to FIG. 2B, a close-up illustration of a non-limiting embodiment of a mandrel 104 with a first plurality of walls 200 projecting from a first cylindrical surface 112 forming a first plurality of channels 204 is shown. In non-limiting illustrative embodiments, first plurality of walls 200 forming first plurality of channels 204 may extend outward from an upper edge 120 with a plurality of projecting tabs 224, which may cause first plurality of walls 200 to join second plurality of walls 208 and second plurality of channels 212 on a second cylindrical surface 116, in a similar position opposite a first cylindrical surface 112. Alternatively, or additionally, plurality of extension tabs 224 may extend from lower edge 124; in other words first plurality of walls 200 forming first plurality of channels 204 may extend outward from a lower edge 124 for a second plurality of walls 208 forming a second plurality of channels 212. Plurality of windings 128 may be channeled in plurality of channels on both first cylindrical surface 112, and second cylindrical surface 116. Plurality extension tabs 224 extending on an upper edge 120 and a lower edge 124 may secure windings over edges during the manufacturing process described herein, maintaining separation between turns of windings; plurality of extension tabs may be composed of any material and/or combination of materials suitable for composition of plurality of walls, including without limitation dielectric material for insulation between the windings, as described previously. In an alternate embodiment, each turn may not include the first upper section, the first lower section and the first middle section, for instance and without limitation, the plurality of windings 128 may take the form of any helical winging where each turn may define any suitable path over a first surface and/or second surface of the mandrel, optionally including any other feature as described herein for mandrel and paths across the mandrel.

Referring again to FIG. 1, in non-limiting illustrative embodiments, mandrel first half 156 may have a first winding 164 and mandrel second half 160 may have a second winding 168. Alternatively or additionally, mandrel 104 may include a single segment, or any number of segments, each with a winding of plurality of windings 128. In non-limiting illustrative embodiments, two mandrel halves may be joined by the addition of fasteners, screws, connectors, or any mechanical coupling device, as described in further detail below.

Referring now to FIG. 3, a schematic diagram illustrates a winding 300 on a mandrel half; winding 300 may be suitable for use as a first winding 164 and/or second winding 168. A first winding 300 may include a first phase (initially denoted A1) that may traverse a first set of channels from a first end 304, to a second end 308, passing through a mandrel through-hole 216 at a second end 308 (with first phase now denoted as A2). A2 now traverses a second set of channels back to the first end 304. A first phase may additionally pass through a second mandrel through-hole 216 at a first end 304 (after which first phase is denoted as A3 in FIG. 3), and traverse a third set of channels to a second end 308, and may pass through a third mandrel through-hole 216 at a second end 308 (now denoted as A4), and traverses a fourth set of channels back to a first end 304. A first winding 300 may include at least a second phase electrically isolated from the first phase; as illustrated without limitation in FIG. 3 there may be three total phases (A1-4, B1-4, and C1-4). Alternatively, or additionally, there may be more than three total phases of windings, or less than three phases. A first winding 300 may be connected to at least a first inverter to provide current to the winding. In non-limiting illustrative embodiments, each half of mandrel 104 may have 3 phases, corresponding to a total of 6 windings, and therefore there may be 6 inverters connected to 6 windings. A second winding may include a second phase that traverses a fifth set of channels from a fourth end to a fourth through-hole at the third end, and then traverses a sixth set of channels back to the fourth end, as described in a first winding 300 in FIG. 3. A third winding may include a third phase that traverses a fifth through hole at a fourth end, and may traverse a seventh set of channels to a second end, and may pass through a sixth through-hole at a third end, and traverse an eighth set of channels back to a fourth end. A second winding may include at least a fourth phase electrically isolated from the first three phases. Alternatively, or additionally, there may be a single phase, or any number of electrically isolated phases for a winding, and there may be a single winding or any number of windings A second winding is connected to at least a second inverter, and in non-limiting illustrative embodiments, each winding may be connected to at least its own inverter. Exemplary embodiments of inverters to which windings may connect are illustrated below for exemplary purposes; there may be any number of inverters and corresponding windings, including without limitation six inverters and six corresponding windings.

Figure 4A:
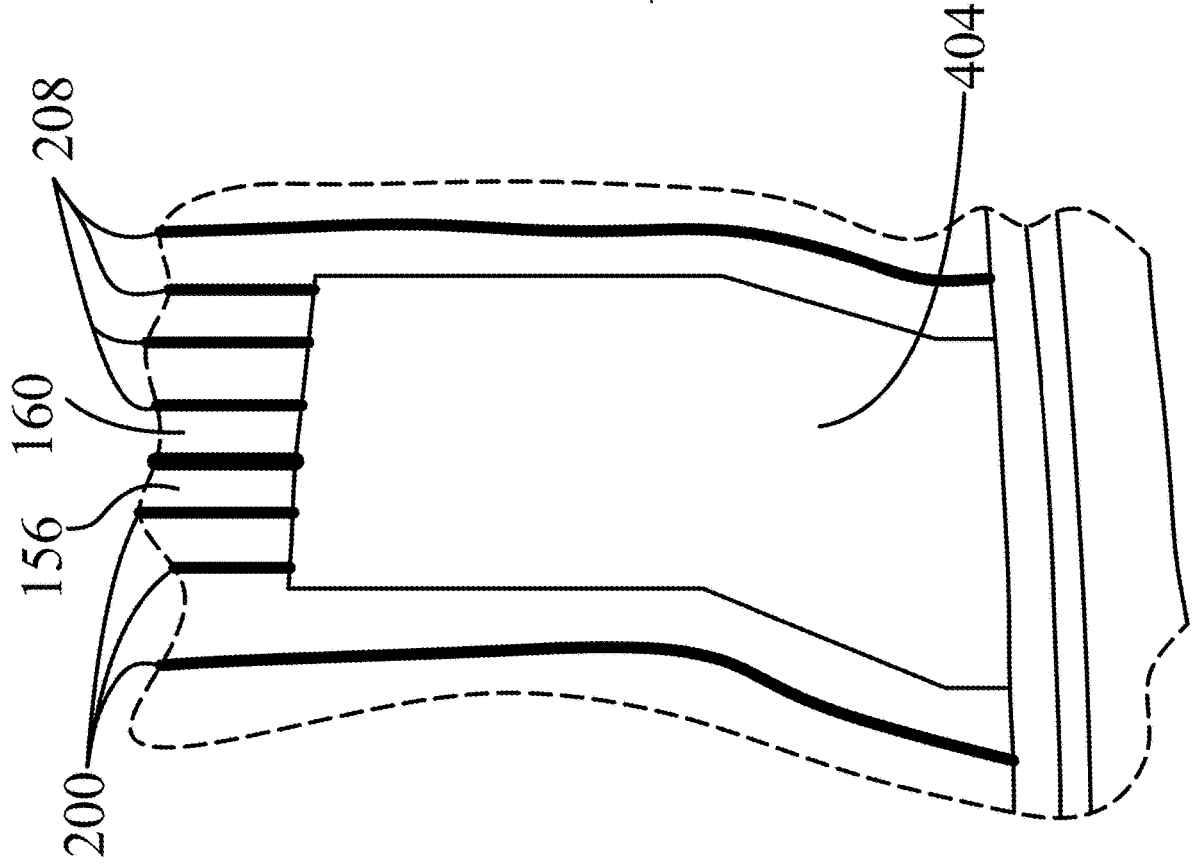
FIG. 4A is an illustration of an embodiment of a mandrel connector piece.

Referring now to FIG. 4A, in non-limiting illustrative embodiments, mandrel first half 156 first end may be joined to a mandrel second half 160 third end, as described before, by the addition of a connecter piece 404, fastener, bracket, pin connector, architectural taper, custom cast or 3D printed connector, or any other suitable component for joining mandrel halves. In non-limiting embodiments, a connector piece 404 may be made of dielectric material as described before, such as polyetherimide, other plastics, epoxies, or other suitable materials. Connector piece 404 may have ridges that conform to shapes of walls 200 on first half and second half, such that when connector piece 404 is in place, connector piece 404 holds first half and second half together by walls 200; connector pieces 404 may be place on first surface and/or second surface of mandrel at joints where halves come together. A connector piece may be snapped into place over a first plurality of walls 200 on a mandrel first half 156 and may snap into place over a second plurality of walls 208 on a mandrel second half 160, securing the ends together, spreading the mechanical load. Connector piece may function to hold the mandrel in a full cylindrical shape during the manufacturing process prior to the addition of protective materials, as described in further detail below, as well as aiding in torque resistance and structural integrity of assembled stator assembly 100.

Referring now to FIG. 4B, in non-limiting illustrative embodiments, joined cylindrical mandrel segments with a plurality of windings may be secured by application of dielectric material in the form of adhesives, epoxies, glues, tapes, amongst other forms, around windings, around a first cylindrical surface 112, a second cylindrical surface 116, over a upper edge 120 and a lower edge 124, etc., to secure windings in channels prior to encasing the mandrel in an enclosure 408. An enclosure 408 may be designed to allow a mandrel 104 to withstand mechanical forces, high temperatures, and any other forces that may be exerted during operation. In non-limiting illustrative embodiments, an enclosure 408 may be composed of synthetic polymer sheets or fibers, including without limitation aramid fibers such as KEVLAR, produced by DuPont Incorporated of Wilmington, Del. An enclosure 408 may be composed of dielectric materials such as nylon, or other polymers or fibers, amongst other suitable materials. Materials may be wrapped around the windings and mandrel, brushed on, filled in, injected, infused, or added in any other manner to secure windings. Materials may be deposited in one or more layers to secure windings. A mandrel 104 may be further secured with connector ring 408 pieces at the upper edge 120 and lower edge 124 of a mandrel 104. Connector ring 408 pieces may be composed of metals such as aluminum, copper, and/or steel, plastics, carbon fiber, polymers, fibers, ceramics, or any other suitable material for structural components in an aircraft. A connector ring 408 may contain grooves in one side that may function to guide and secure a mandrel 104 upper edge 120 and/or a mandrel lower edge 124. A connector ring 408 and may secure one or both edges of a mandrel 104, and may attach the encased mandrel 104 assembly to the electrical motor and/or as a structural attachment to the stator of an aircraft using a screw, bolt, fastener, adhesive, glue, epoxy, or any other suitable method for attaching aircraft components. Each connector ring 408 may have a groove facing a respective edge of mandrel 104, such that the mandrel 104 edge may be inserted therein to secure mandrel 104 in place. Connector rings 408 may include bolt holes, projections, and/or other elements suitable for use in connection to additional parts of a stator; persons skilled in the art, upon reviewing the entirety of this disclosure, will be aware of various forms that support structures may take consistently with the described methods and systems.

Figure 5:
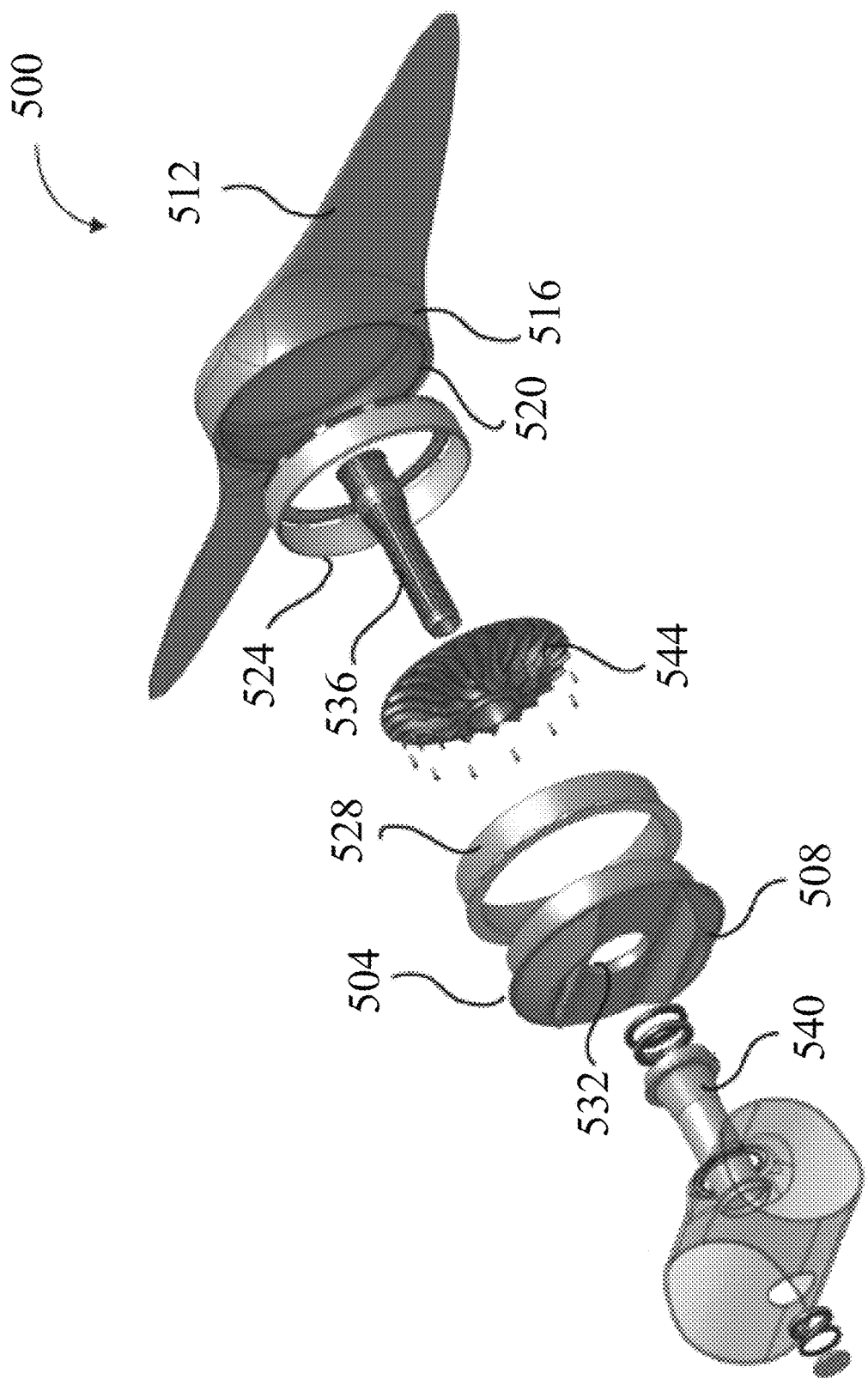
FIG. 5 is an exploded view of an embodiment of an integrated electric propulsion assembly.

Referring now to FIG. 5, an embodiment of an integrated electric propulsion assembly 500 is illustrated. Integrated electric propulsion assembly 500 includes at least a stator 504. Stator 504, as used herein, is a stationary component of a motor and/or motor assembly. In an embodiment, stator 504 includes at least a first magnetic element 508. As used herein, first magnetic element 508 is an element that generates a magnetic field. For example, first magnetic element 508 may include one or more magnets which may be assembled in rows along a structural casing component. Further, first magnetic element 508 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. A first magnetic element 508 may act to produce or generate a magnetic field to cause other magnetic elements to rotate, as described in further detail below. Stator 504 may include a frame to house components including at least a first magnetic element 508, as well as one or more other elements or components as described in further detail below. In an embodiment, a magnetic field can be generated by a first magnetic element 508 and can comprise a variable magnetic field. In embodiments, a variable magnetic field may be achieved by use of an inverter, a controller, or the like. In an embodiment, stator 504 may have an inner and outer cylindrical surface; a plurality of magnetic poles may extend outward from the outer cylindrical surface of the stator. In an embodiment, stator 504 may include an annular stator, wherein the stator is ring-shaped. In an embodiment, stator 504 is incorporated into a DC motor where stator 504 is fixed and functions to supply the magnetic fields where a corresponding rotor, as described in further detail below, rotates.

Still referring to FIG. 5, integrated electric propulsion assembly 500 includes propulsor 512. In embodiments, propulsor 512 can include an integrated rotor. As used herein, a rotor is a portion of an electric motor that rotates with respect to a stator of the electric motor, such as stator 504. A propulsor, as used herein, is a component or device used to propel a craft by exerting force on a fluid medium, which may include a gaseous medium such as air or a liquid medium such as water. Propulsor 512 may be any device or component that consumes electrical power on demand to propel an aircraft or other vehicle while on ground and/or in flight. Propulsor 512 may include one or more propulsive devices. In an embodiment, propulsor 512 can include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like.

In an embodiment, propulsor 512 may include at least a blade. As another non-limiting example, a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as propulsor 512. In an embodiment, when a propulsor twists and pulls air behind it, it will, at the same time, push the aircraft forward with an equal amount of force. The more air pulled behind the aircraft, the more the aircraft is pushed forward.

In an embodiment, thrust element may include a helicopter rotor incorporated into propulsor 512. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 5, propulsor 512 can include a hub 516 rotatably mounted to stator 504. Rotatably mounted, as described herein, is functionally secured in a manner to allow rotation. Hub 516 is a structure which allows for the mechanically coupling of components of the integrated rotor assembly. In an embodiment, hub 516 can be mechanically coupled to propellers or blades. In an embodiment, hub 516 may be cylindrical in shape such that it may be mechanically joined to other components of the rotor assembly. Hub 516 may be constructed of any suitable material or combination of materials, including without limitation metal such as aluminum, titanium, steel, or the like, polymer materials or composites, fiberglass, carbon fiber, wood, or any other suitable material. Hub 516 may move in a rotational manner driven by interaction between stator and components in the rotor assembly. Persons skilled in the art, upon reviewing the entirety of this disclosure, will be aware of various structures that may be used as or included as hub 516, as used and described herein.

Still referring to FIG. 5, propulsor 512 can include a second magnetic element 520, which may include one or more further magnetic elements. Second magnetic element 520 generates a magnetic field designed to interact with first magnetic element 508. Second magnetic element 520 may be designed with a material such that the magnetic poles of at least a second magnetic element are oriented in an opposite direction from first magnetic element 508. In an embodiment, second magnetic element 520 may be affixed to hub 516. Affixed, as described herein, is the attachment, fastening, connection, and the like, of one component to another component. For example, and without limitation, affixed may include bonding the second magnetic element 520 to hub 516, such as through hardware assembly, spot welding, riveting, brazing, soldering, glue, and the like. Second magnetic element 520 may include any magnetic element suitable for use as a first magnetic element 508. For instance, and without limitation, second magnetic element may include a permanent magnet and/or an electromagnet. Second magnetic element 520 may include magnetic poles oriented in a second direction opposite of the orientation of the poles of first magnetic element 508. In an embodiment, electric propulsion assembly 500 includes a motor assembly incorporating stator 504 with a first magnet element and second magnetic element 520. First magnetic element 508 includes magnetic poles oriented in a first direction, a second magnetic element includes a plurality of magnetic poles oriented in the opposite direction than the plurality of magnetic poles in the first magnetic element 508.

Continuing to refer to FIG. 5, second magnetic element 520 may include a plurality of magnets attached to or integrated in hub 516. In an embodiment, hub 516 may incorporate structural elements of the rotor assembly of the motor assembly. As a non-limiting example hub 516 may include a motor inner magnet carrier 524 and motor outer magnet carrier 528 incorporated into the hub 516 structure. In an embodiment motor inner magnet carrier 524 and motor outer magnet carrier 528 may be cylindrical in shape. In an embodiment, motor inner magnet carrier 524 and motor out magnet carrier 516 may be any shape that would allow for a fit with the other components of the rotor assembly. In an embodiment, hub 516 may be short and wide in shape to reduce the profile height of the rotating assembly of electric propulsion assembly 500. Reducing the profile assembly height may have the advantage of reducing drag force on the external components. In an embodiment, hub 516 may also be cylindrical in shape so that fitment of the components in the rotor assembly are structurally rigid while leaving hub 516 free to rotate about stator.

In an embodiment, motor outer magnet carrier 528 may have a slightly larger diameter than motor inner magnet carrier 524, or vice-versa. First magnetic element 508 may be a productive element, defined herein as an element that produces a varying magnetic field. Productive elements will produce magnetic field that will attract and other magnetic elements, including a receptive element. Second magnetic element may be a productive or receptive element. A receptive element will react due to the magnetic field of a first magnetic element 508. In an embodiment, first magnetic element 508 produces a magnetic field according to magnetic poles of first magnetic element 508 oriented in a first direction. Second magnetic element 520 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 516 and rotor assembly may both be cylindrical in shape where rotor may have a slightly smaller circumference than hub 516 to allow the joining of both structures. Coupling of hub 516 to stator 504 may be accomplished via a surface modification of either hub 516, stator 504 or both to form a locking mechanism. Coupling may be accomplished using additional nuts, bolts, and/or other fastening apparatuses. In an embodiment, an integrated rotor assembly as described above reduces profile drag in forward flight for an electric aircraft. Profile drag may be caused by a number of external forces that the aircraft is subjected to. By incorporating a propulsor 512 into hub 516, a profile of integrated electric propulsion assembly 500 may be reduced, resulting in a reduced profile drag, as noted above. In an embodiment, the rotor, which includes motor inner magnet carrier 524, motor outer magnet carrier 528, propulsor 512 is incorporated into hub 516 to become one integrated unit. In an embodiment, inner motor magnet carrier 512 rotates in response to a magnetic field. The rotation causes hub 516 to rotate. This unit can be inserted into integrated electric propulsion assembly 500 as one unit. This enables ease of installation, maintenance, and removal.

Still referring to FIG. 5, stator 504 may include a through-hole 532. Through-hole 532 may provide an opening for a component to be inserted through to aid in attaching propulsor with integrated rotor to stator. In an embodiment, through-hole 532 may have a round or cylindrical shape and be located at a rotational axis of stator 504. Hub 516 may be mounted to stator 504 by means of a shaft 536 rotatably inserted though through hole 532. Through-hole 532 may have a diameter that is slightly larger than a diameter of shaft 536 to allow shaft 536 to fit through through-hole 532 to connect stator 504 to hub 516. Shaft 536 may rotate in response to rotation of propulsor 512.

Still referring to FIG. 5, integrated electric propulsion assembly 500 may include a bearing cartridge 540. Bearing cartridge 540 may include a bore. Shaft 536 may be inserted through the bore of bearing cartridge 540. Bearing cartridge 540 may be attached to a structural element of a vehicle. Bearing cartridge 540 functions to support the rotor and to transfer the loads from the motor. Loads may include, without limitation, weight, power, magnetic pull, pitch errors, out of balance situations, and the like. A bearing cartridge 540 may include a bore. a bearing cartridge 540 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. a bearing cartridge 540 may be subject to a load which may include, without limitation, a radial or a thrust load. Depending on the location of bearing cartridge 540 in the assembly, it may see all of a radial or thrust load or a combination of both. In an embodiment, bearing cartridge 540 may join integrated electric propulsion assembly 500 to a structure feature. A bearing cartridge 540 may function to minimize the structural impact from the transfer of bearing loads during flight and/or to increase energy efficiency and power of propulsor. a bearing cartridge 540 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 540 may act to keep a propulsor 512 and components intact during flight by allowing integrated electric propulsion assembly 500 to rotate freely while resisting loads such as an axial force. In an embodiment, bearing cartridge 540 includes a roller bearing incorporated into the bore. a roller bearing is in contact with propulsor shaft 536. Stator 504 is mechanically coupled to inverter housing 540. Mechanically coupled may include a mechanical fastening, without limitation, such as nuts, bolts or other fastening device. Mechanically coupled may include welding or casting or the like. Inverter housing contains a bore which allows insertion by propulsor shaft 536 into bearing cartridge 540.

Still referring to FIG. 5, electric propulsion assembly 500 may include a motor assembly incorporating a rotating assembly and a stationary assembly. Hub 516, motor inner magnet carrier 524 and propulsor shaft 536 may be incorporated into the rotor assembly of electric propulsion assembly 500 which make up rotating parts of electric motor, moving between the stator poles and transmitting the motor power. As one integrated part, the rotor assembly may be inserted and removed in one piece. Stator 504 may be incorporated into the stationary part of the motor assembly. Stator and rotor may combine to form an electric motor. In embodiment, an electric motor may, for instance, incorporate coils of wire which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, a first magnetic element 508 in electric propulsion assembly 500 may include an active magnet. For instance, and without limitation, a second magnetic element may include a passive magnet, a magnet that reacts to a magnetic force generated by a first magnetic element 508. In an embodiment, a first magnet positioned around the rotor assembly, may generate magnetic fields to affect the position of the rotor relative to the stator 504. A controller 904 may have an ability to adjust electricity originating from a power supply and, thereby, the magnetic forces generated, to ensure stable rotation of the rotor, independent of the forces induced by the machinery process. Electric propulsion assembly 500 may include an impeller 544 coupled with the shaft 536. An impeller, as described herein, is a rotor used to increase or decrease the pressure and flow of a fluid and/or air. Impeller 544 may function to provide cooling to electric propulsion assembly 500. Impeller 544 may include varying blade configurations, such as radial blades, non-radial blades, semi-circular blades and airfoil blades. Impeller 514 may further include single and/or double-sided configurations. Impeller 514 is described in further detail below.

Figure 6:
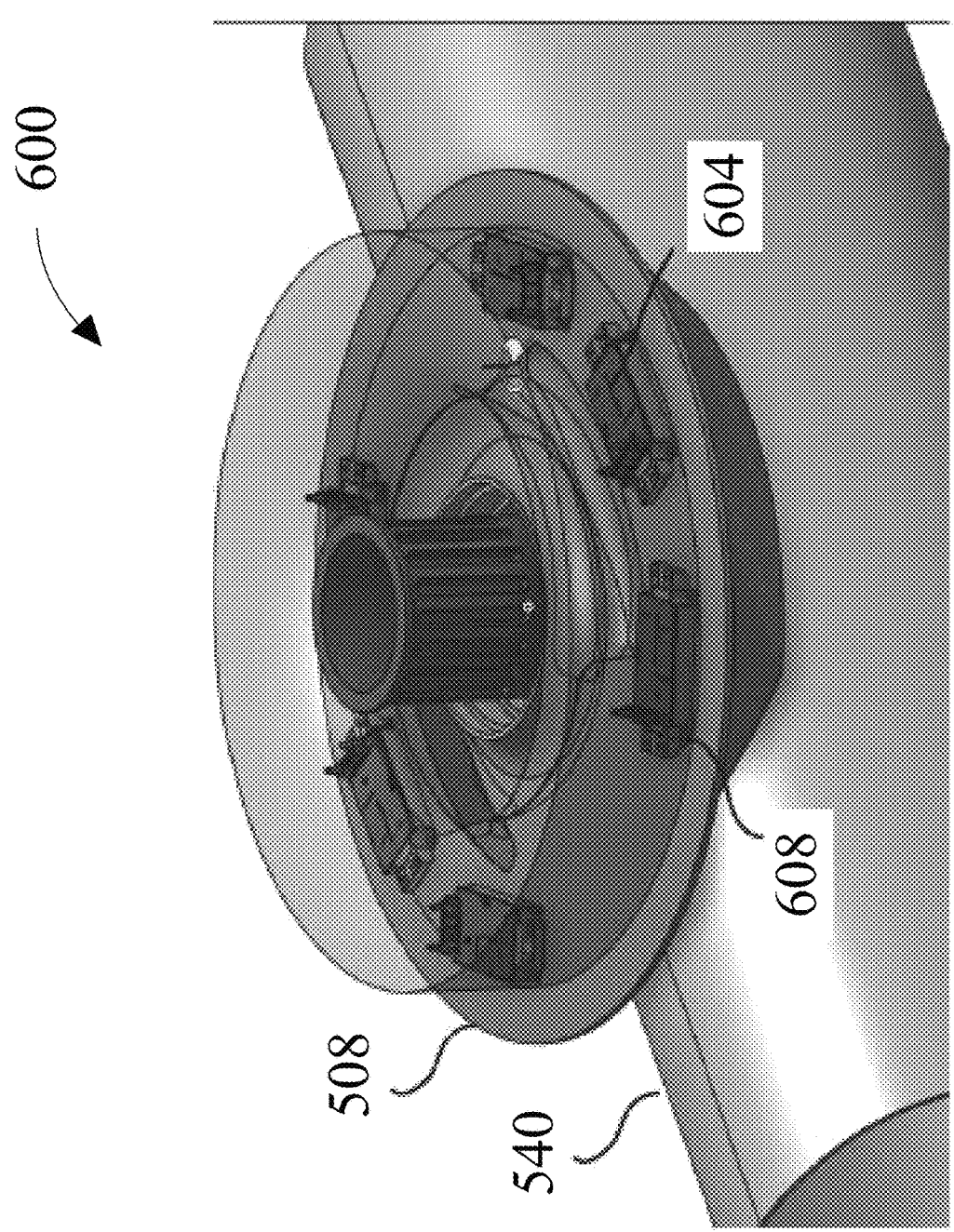
FIG. 6 is an illustration of an embodiment of a stator including an inverter.

Now referring to FIG. 6, an embodiment of an inverter housing 600 is shown. Inverter housing 600 may provide structural support to stator 504 and other components of the assembly. Inverter housing 600 may include air ducts 604. Air ducts 604 are designed to allow air flow into electric propulsion assembly 500 during use. Inverter housing may include inverters 608. Inverter 608 may function as a frequency converter and changes the DC power from a power source into AC power to drive the motor by adjusting the frequency and voltage supplied to the motor. Inverter 608 may be entirely electronic or a combination of mechanical elements and electronic circuitry. Inverter 608 may allow for variable speed and torque of the motor based on the demands of the vehicle. Inverter housing may be made of any suitable materials to enclose and protect the components of the inverter. Inverter housing 600 may be made from varying materials such as, carbon fiber, metal, stainless steel, plastic, or any other suitable material or combination of multiple materials. Inverter housing 600 may be in any shape that enclosed the inverter components and fits into an assembly.

Figure 7:
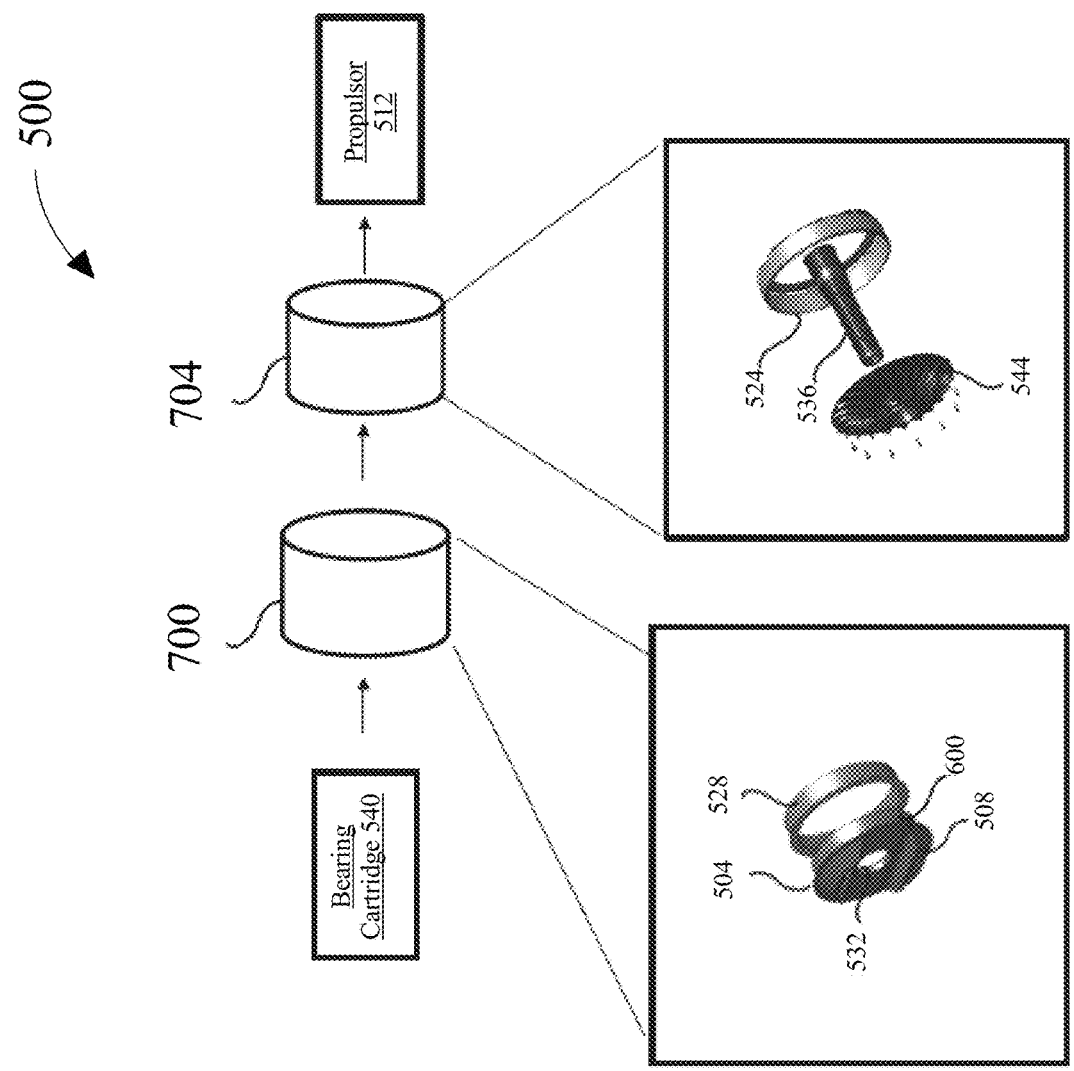
FIG. 7 is an exploded view of an embodiment of an integrated propulsion assembly.

Now referring to FIG. 7, electric propulsion assembly 500 may include a first annular cylindrical section 700 that houses a first magnetic element 508. Electric propulsion assembly 500 may further include a second magnetic element 520 may be housed in a second annual cylindrical section 704. Second annular cylindrical section 704 may fit concentrically into the first annular cylindrical section. First annular cylindrical section 700 may be constructed of any materials with appropriate properties such as, without limitation, strength and resistance to torque and other forces experienced during use, including while in air. In an embodiment, first annular cylindrical section 700 and second annular cylindrical section 704 may be integrated into hub 516. In an embodiment, first annular cylindrical section 700 may include shaft 536 which may connect impeller 544, and outer motor magnet 524 and be joined with hub 516 and propulsor 512 or another structural element. Second annular cylindrical section 704 may include stator 504, inner motor magnet carrier 528 and/or inverter housing 600 and may be joined to bearing cartridge 540 or another structural element. In this embodiment, the components contained within first annular cylindrical section 700 and second annular cylindrical section 704, when joined, will function to provide thrust for electric propulsion assembly 500. First annular cylindrical section 700 may be inserted into the second annular cylindrical section 704 concentrically as the outer diameter of first annular cylindrical section 700 is smaller than the inner diameter of the second annular cylindrical section 704.

Figure 8:
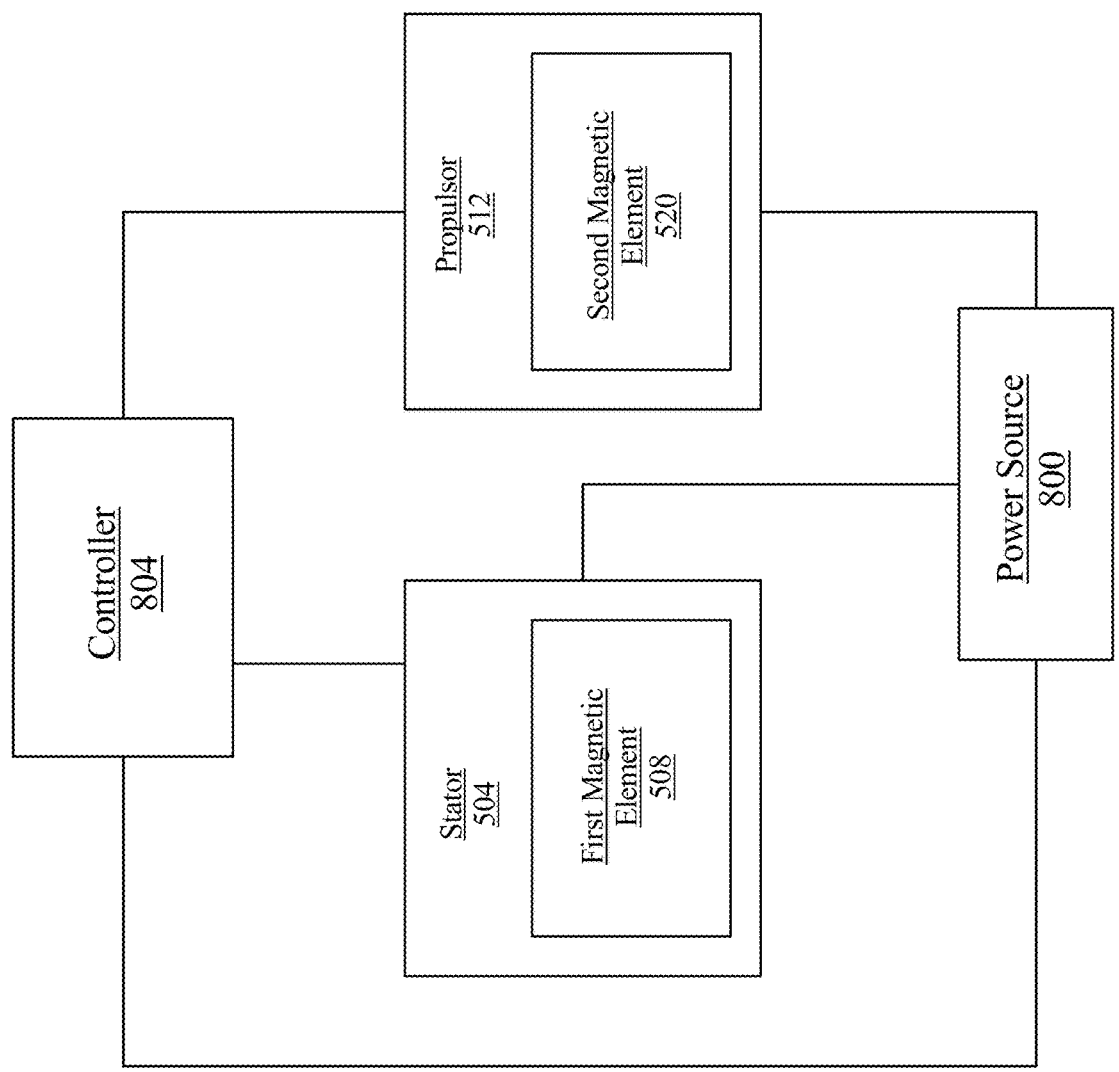
FIG. 8 is a block diagram of an embodiment of an integrated electric propulsion assembly.

Referring now to FIG. 8, a block diagram of an embodiment of an integrated electric propulsion assembly 500 is illustrated. Assembly 500 may include a power source 800 to provide electrical energy to the stator 504 for the generation of a magnetic field by the plurality of magnets. a power source 800 may be driven by direct current (DC) electric power; for instance, a power source 800 may include, without limitation, brushless DC electric motors, switched reluctance motors, or induction motors. For instance, and without limitation, a power source 800 may include electronic speed controllers (not shown) or other components for regulating motor speed, rotation direction, and/or dynamic braking. Power source 800 may include or be connected to one or more sensors (not shown) detecting one or more conditions of at power source 800. The conditions may include, without limitation, voltage levels, electromotive force, current levels, temperature, current speed of rotation, and the like. The sensors may communicate a current status of power source 800 to a person operating electric propulsion assembly 500 or a computing device; computing device may include any computing device as described below in reference to FIG. 11, including without limitation a vehicle controller as set forth in further detail below. Persons skilled in the art, upon reviewing the entirety of this disclosure, will be aware of various devices and/or components that may be used as or included a power source 800 or a circuit operating a power source 800, as used and described herein. As a further example and without limitation, a power source 800 may include a battery cell. Power source 800 may be a high specific energy density energy source designed to deliver an amount of energy per mass for a period of time. Specific energy capacity is expressed in units of Wh/kg. Power sources 800 may be designed as high energy density to supply a load for extended periods of time, repeatedly. High specific power density energy sources are designed to deliver a high amount of power in a specific period of time. Specific power density is expressed in units of W/kg. Power source 800 may be designed as high-power density to be capable of delivering high amounts of power in shorter amounts of time repeatedly. In an embodiment, power source 800 include both a high specific energy source and a high specific power source with technology such as a lithium ion battery, the high specific power density energy source may have a higher voltage made available by connected the cells in series to increase the voltage than high specific energy density energy source. Some battery chemistries offer better energy density than power density and vice versa. Most lithium ion chemistries offer both qualities and are arrange and/or used to supply either energy or power or both for a given application. The application and demand on the battery for a particular period of time will determine is that particular assembly is a high energy density energy source or a high-power density energy source. For example power source 800 may include, without limitation, a generator, a capacitor, a supercapacitor, a photovoltaic device, a fuel cell such as a hydrogen fuel cell, direct methanol fuel cell, and/or solid oxide fuel cell, or an electric energy storage device; electric energy storage device may include without limitation a capacitor, an inductor, and/or a battery.

Still referring to FIG. 8, integrated electric propulsion assembly 500 may include controller 804. Controller 804 may include and/or communicate with any computing device as described in this disclosure, including without limitation a microcontroller, microprocessor, digital signal processor (DSP) and/or system on a chip (SoC) as described in this disclosure. Controller 804 may be installed in an aircraft, may control the aircraft remotely, and/or may include an element installed in the aircraft and a remote element in communication therewith. Controller 804 may include, be included in, and/or communicate with a mobile device such as a mobile telephone or smartphone. Controller 804 may include a single computing device operating independently, or may include two or more computing device operating in concert, in parallel, sequentially or the like; two or more computing devices may be included together in a single computing device or in two or more computing devices. Controller 804 with one or more additional devices as described below in further detail via a network interface device. Network interface device may be utilized for connecting a controller 804 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 804 may include but is not limited to, for example, a controller 904 or cluster of computing devices in a first location and a second computing device or cluster of computing devices in a second location. In an embodiment, controller 804 may include one or more computing devices dedicated to data storage, security, distribution of traffic for load balancing, and the like. In an embodiment, controller 804 may distribute one or more computing tasks as described below across a plurality of computing devices of computing device, which may operate in parallel, in series, redundantly, or in any other manner used for distribution of tasks or memory between computing devices. Controller 804 may be implemented using a "shared nothing" architecture in which data is cached at the worker, in an embodiment, this may enable scalability of system 500 and/or computing device.

With continued reference to FIG. 8, stator 504, including motor inner magnet carrier 524 and motor outer magnet carrier 528, may include or be connected to one or more sensors (not shown) detecting one or more conditions of a motor. The conditions may include, without limitation, voltage levels, electromotive force, current levels, temperature, current speed of rotation, and the like. Sensors, as described herein, are any device, module, and/or subsystems, utilizing any hardware, software, and/or any combination thereof to detect events and/or changes in the instant environment and communicate the information to the controller 904. For example, and without limitation, a sensor may be located inside the electric aircraft; a sensor may be inside a component of the aircraft. Sensor 516 may be incorporated into vehicle or aircraft or be remote. As a further example and without limitation, sensor may be communicatively connected to the controller 804. Sensor 516 may communicate a current status of a motor to a person operating electric propulsion assembly 500 or a computing device. Computing device may include any computing device as described below in reference to FIG. 11, including without limitation a vehicle controller as set forth in further detail below. Persons skilled in the art, upon reviewing the entirety of this disclosure, will be aware of various devices and/or components that may be used as or included in a motor or a circuit operating a motor, as used and described herein.

Continuing to refer to FIG. 8, power source 800 may supply electrical power to a portion of stator 504. Electrical power, in the form of electric current, may generate a first magnetic field by first magnet element 508 and a second magnetic field by a second magnetic element 520 by use of inverter 608. A magnetic force between the first magnetic field and the second magnetic field may cause the rotor assembly of electric propulsion assembly 500 to rotate with respect to the stationary components of the motor assembly. Electric propulsion assembly 500 may include an electric motor. Electric motor may be a DC brushless motor.

Figure 9:
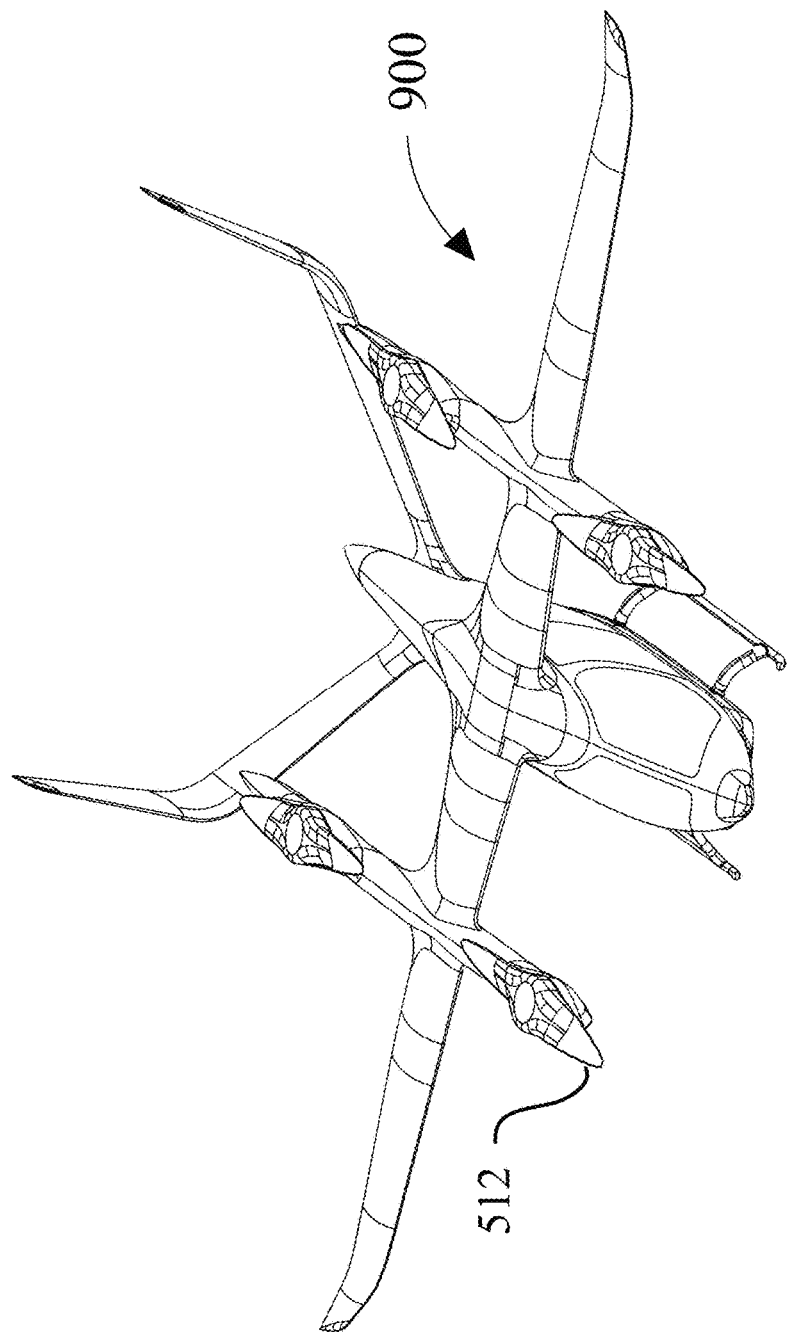
FIG. 9 is an embodiment of an integrated electric propulsion assembly incorporated in an electric aircraft.

Now referring to FIG. 9, integrated electric propulsor assembly 500 may be mounted on a structural feature. Design of integrated electric propulsion assembly 500 may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge 540. Further, a structural feature may include a component of an aircraft 900. For example, and without limitation structural feature may be any portion of a vehicle incorporating integrated electric propulsion assembly 500, including any vehicle as described below. As a further non-limiting example, a structural feature may include without limitation a wing, a spar, an outrigger, a fuselage, or any portion thereof persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least a propulsor 512. Persons skilled in the art, upon reviewing the entirety of this disclosure, will be aware of various materials, combinations of materials, and/or constructions techniques.

Still referring to FIG. 9, electric aircraft 900 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 9, a number of aerodynamic forces may act upon the electric aircraft 900 during flight. Forces acting on an electric aircraft 900 during flight may include, without limitation, thrust, the forward force produced by the rotating element of the electric aircraft 900 and acts parallel to the longitudinal axis. Another force acting upon electric aircraft 900 may be, without limitation, drag, which may be defined as a rearward retarding force which is caused by disruption of airflow by any protruding surface of the electric aircraft 900 such as, without limitation, the wing, rotor, and fuselage. Drag may oppose thrust and acts rearward parallel to the relative wind. A further force acting upon electric aircraft 900 may include, without limitation, weight, which may include a combined load of the electric aircraft 900 itself, crew, baggage, and/or fuel. Weight may pull electric aircraft 900 downward due to the force of gravity. An additional force acting on electric aircraft 900 may include, without limitation, lift, which may act to oppose the downward force of weight and may be produced by the dynamic effect of air acting on the airfoil and/or downward thrust from the propulsor 512 of the electric aircraft. Lift generated by the airfoil may depend on speed of airflow, density of air, total area of an airfoil and/or segment thereof, and/or an angle of attack between air and the airfoil. For example, and without limitation, electric aircraft 900 are designed to be as lightweight as possible. Reducing the weight of the aircraft and designing to reduce the number of components is essential to optimize the weight. To save energy, it may be useful to reduce weight of components of an electric aircraft 900, including without limitation propulsors and/or propulsion assemblies. In an embodiment, integrated electric propulsion assembly 500 may eliminate need for many external structural features that otherwise might be needed to join one component to another component. Integrated electric propulsion assembly 500 may also increase energy efficiency by enabling a lower physical propulsor profile, reducing drag and/or wind resistance. This may also increase durability by lessening the extent to which drag and/or wind resistance add to forces acting on electric aircraft 900 and/or propulsors.

Still referring to FIG. 9, electric aircraft 900 can include at least an integrated electric propulsion assembly 500. Electric propulsion assembly 500 includes a stator 504 which has a first magnetic generating element generating a first magnetic field. Electric propulsion assembly 500 also includes a propulsor 512 with an integrated rotor assembly of the motor assembly which includes a hub 516 mounted to stator 504, at least a second magnetic element generating a second magnetic field. First magnetic field and second magnetic field vary with respect to time which generates a magnetic force between both causing the rotor assembly to rotate with respect to stator 504.

An embodiment of a stator, such as without limitation stator 504 as described above may include varying windings. Varying windings such as angularly varying windings, such as a varying winding consisting of an angled orientation to the stator, nonhomogeneous varying windings, such as varying windings consisting of differing attributes wherein the attributes may include, size, shape, location, placement, and the like, and/or any combination thereof, for instance and without limitation as described above. A stator may further include varying windings, wherein the varying windings may have a varying number of turns per section of a stator as a function of the location of the varying winding on the annular stator, for instance and without limitation as described above. A stator may include a stator shaped in an annular arrangement, wherein the annular arrangement includes windings that vary annularly around a stator, for instance and without limitation as described above. As a further example and without limitation, a stator may be configured to generate a varying magnetic field that varies with respect to time, wherein the varying magnetic field comprises a difference between a first orientation of a first magnetic field and a second orientation of a second magnetic field, as described above in reference to FIGS. 1-5. The varying magnetic field may further include generating a magnetic force between the at least a first magnetic element 508, for instance as described above, and at least a second magnetic element, for instance as described above, magnetic force may cause a hub, such as without limitation a hub 516 as described above, to rotate with respect to stator, for instance and without limitation as described above in reference to FIGS. 1-5. As another non-limiting example, a stator may interact with a rotor; the rotor may be is integrated in a propulsor, for instance and without limitation as described above in reference to FIGS. 1-5. As a further example and without limitation, a stator may interact with an alternator, as described above in further detail. The alternator, as described herein, is an electrical generator that converts mechanical energy to electrical energy in the form of alternating current. For another example, a stator may interact and/or be included in any part and/or combination of parts of a motor; wherein the motor may include any motor as described above in reference to FIGS. 1-5.

In an embodiment, the above-described elements may alleviate problems resulting from systems where weight and space of the design cause an extra demand on power source 800 of an electric aircraft. When designing a propulsion unit for an aircraft, a profile of the propulsion unit may be minimized to reduce profile drag. Reducing profile drag will reduce the demand on the power source 800 which will allow for extended flight maneuvers such as hovering. Using a hub 516 integrated with the rotating elements of integrated electric propulsion assembly 500 including rotor assembly, propulsor 512 and hub 516, may allow for ease of maintenance, installation, and removal. As one integrated unit, the rotating components of integrated electric propulsion 500 form a rigid unit that can be easily separated from the stationary pieces, such as stator 504. As one unit, integrated electric propulsion assembly may be installed and removed as one piece. This may reduce maintenance time and wear and tear of the components internal to assembly 500. Reducing weight of the system also may result in a more efficient use of the power source 800 and allows for additional operational time if necessary. The reduction of weight is a result of removing components of the design of integrated electric propulsion assembly 500. Integrated cooling apparatus 300 may be designed with air ducts and channels to direct air flow from external to the aircraft and distribute that air throughout the assembly to cool components which may experience heat during use. Cooling apparatus 300 removes the needs for a cooling media and accompanying system which reduces the weight of the system.

Figure 10:
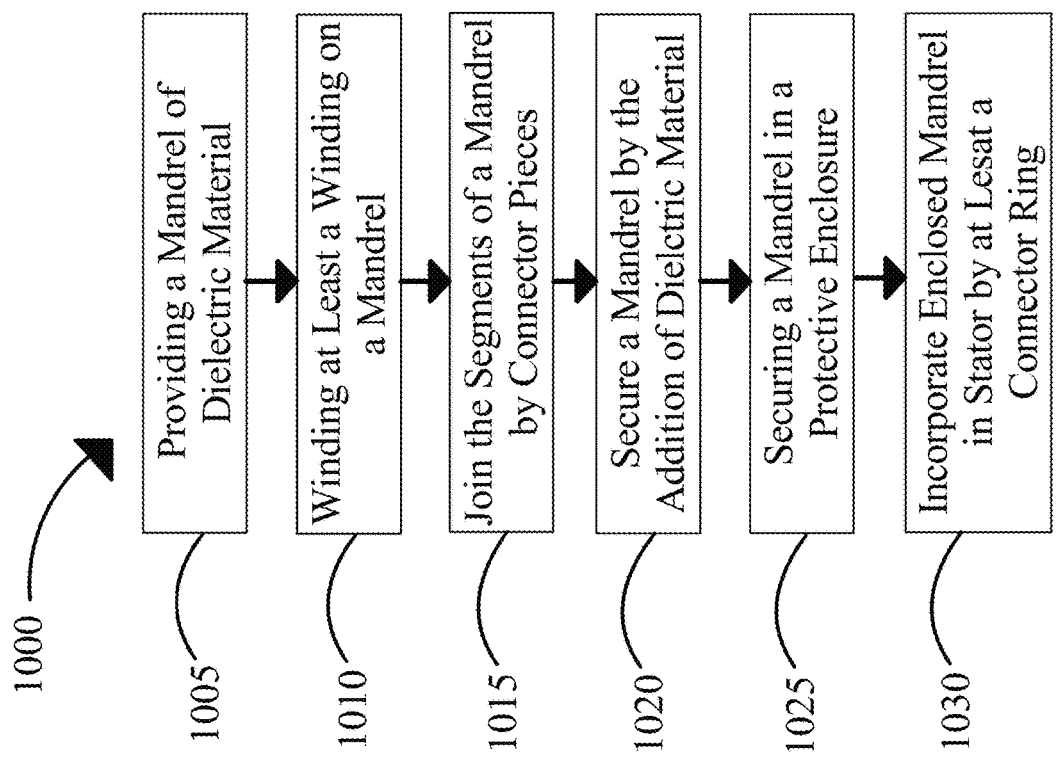
FIG. 10 is a flow diagram illustrating a method for manufacturing the assembly.

Referring now to FIG. 10, a flow diagram of an exemplary embodiment of a method 1000 for manufacturing a stator assembly is illustrated. At step 1005, a mandrel of dielectric material is provided; this may be implemented, without limitation, as described above in reference to FIGS. 1-10B. Providing a mandrel may include, without limitation manufacturing the mandrel using any suitable manufacturing processes. In some embodiments, a manufacturing process is a process used to form a product, which may be an end-product or a part used to assemble an end-product, by the performance of one or more manufacturing steps. As used herein, a workpiece is an object that will become a product when the one or more manufacturing steps been performed. One or more steps in the production of product may include physical modifications to workpiece or programming and modeling steps used to perform the modifications, such as modeling the workpiece or product, or computing toolpaths or other algorithms for the product's manufacture.

Still referring to FIG. 10, one or more steps may include a subtractive manufacturing process, which produces the product by removing material from a workpiece; the removal of material may be accomplished using abrasives, cutting tools or endmills, laser cutting or ablation, removal using heat, or any other method that removes material from the workpiece. Subtractive manufacturing may be performed using water-jet or other fluid-jet cutting techniques.

Fundamentally, any process for removal of material may be employed for subtractive manufacturing. Each subtractive manufacturing process used may be any suitable process, such as, but not limited to, rotary-tool milling, electronic discharge machining, ablation, etching, erosion, cutting, and cleaving, among others.

With continued reference to FIG. 10, if rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to effect the material removal. CNC machines, their operation, programming, and relation to CAM tools and CAD tools are well known and need not be described in detail herein for those skilled in the art to understand the scope of the present invention and how to practice it in any of its widely varying forms.

Still referring to FIG. 10, subtractive manufacturing may be performed using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid-jet cutting techniques. Fundamentally, any process for removal of material may be employed for subtractive manufacturing.

Further referring to FIG. 10, one or more steps may include an additive manufacturing process, in which material is deposited on the workpiece. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process. Each cross-section may, as a non-limiting example be modeled on a computing device as a cross-section of graphical representation of the object to be formed; for instance, a computer aided design (CAD) tool may be used to receive or generate a three-dimensional model of the object to be formed, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing also includes bodies of material that are a hybrid of other types of manufacturing processes, e.g. forging and additive manufacturing as described above. As an example, a forged body of material may have welded material deposited upon it which then comprises an additive manufactured body of material.

Continuing to refer to FIG. 10, deposition of material in additive manufacturing process may be accomplished using any suitable means. Deposition may be accomplished using stereolithography, in which successive layers of polymer material are deposited and then caused to bind with previous layers using a curing process such as curing using ultraviolet light. Additive manufacturing processes may include "three-dimensional printing" processes that deposit successive layers of power and binder; the powder may include polymer or ceramic powder, and the binder may cause the powder to adhere, fuse, or otherwise join into a layer of material making up the body of material or product. Additive manufacturing may include metal three-dimensional printing techniques such as laser sintering including direct metal laser sintering (DMLS) or laser powder-bed fusion. Likewise, additive manufacturing may be accomplished by immersion in a solution that deposits layers of material on the body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Further referring to FIG. 10, additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward-facing surface of additively manufactured body of material is constructed having less than a threshold angle of steepness, support structures may be necessary to support the downward-facing surface; threshold angle may be, for instance 45 degrees. Support structures may be additively constructed and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems.

Continuing to refer to FIG. 10, one or more steps may include a molding and/or injection molding manufacturing process. Molding and/or injection manufacturing may include deposition of a fluid material which may include, without limitation, a molten material, into a mold, cast, die, or any other suitable form. Deposition of a molten material for molding manufacturing may include carbon fiber, ceramics, confections, elastomers, epoxies, glasses, metals, plastics, photopolymers, polymers, resins, rubbers, amongst other suitable materials. Fluid materials, including without limitation molten materials, may be injected into the cavity of a mold and/or die, made of steel, aluminum, beryllium-copper, amongst other materials, until cooled and/or formed; forming may include without limitation any process of solidifying, curing, or thickening fluids into an elastomeric, solid, or other suitable state by processing including without limitation cooling or allowing material to be cooled and/or undergo a phase change and/or any other process of curing materials as described above in additive manufacturing. Manufacturing to produce molds may be performed by standard machining, electric discharge machining (EDM), 3D printing, spark erosion, CNC machining, or any other suitable manufacturing method. Molds may be additively manufactured, subtractively manufactured, machined, or 3D printed. Injection of molten material may be performed by die casting, metal injection molding, thin-wall injection molding, injection molding, 3D printing, reaction injection molding, or any other suitable method. Persons skilled in the art, upon reviewing the entirety of this disclosure, will be aware of various forms that molding and/or injection molding manufacturing may take consistently with the described methods and systems.

Continuing in referring to FIG. 10, at step 1010, at least a winding is disposed on mandrel; this may be implemented, without limitation, as described above in reference to FIGS. 1-10B. At step 1015, one or more mandrel segments may be joined and/or secured by the addition of one or more connector pieces; this may be implemented, without limitation, as described above in reference to FIGS. 1-10B. At step 1020, mandrel may then be further secured by the addition of material in the form of epoxy, glue, adhesives, tape, etc.; this may be implemented, without limitation, as described above in reference to FIGS. 1-10B. At step 1025, secured mandrel may be encased in at least a protective enclosure; this may be may implemented, without limitation, as described above in reference to FIGS. 1-10B. At step 1030, encased mandrel may be incorporated in a stator by addition of connector rings 1030; this may be implemented, without limitation, as described above in reference to FIGS. 1-10B.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
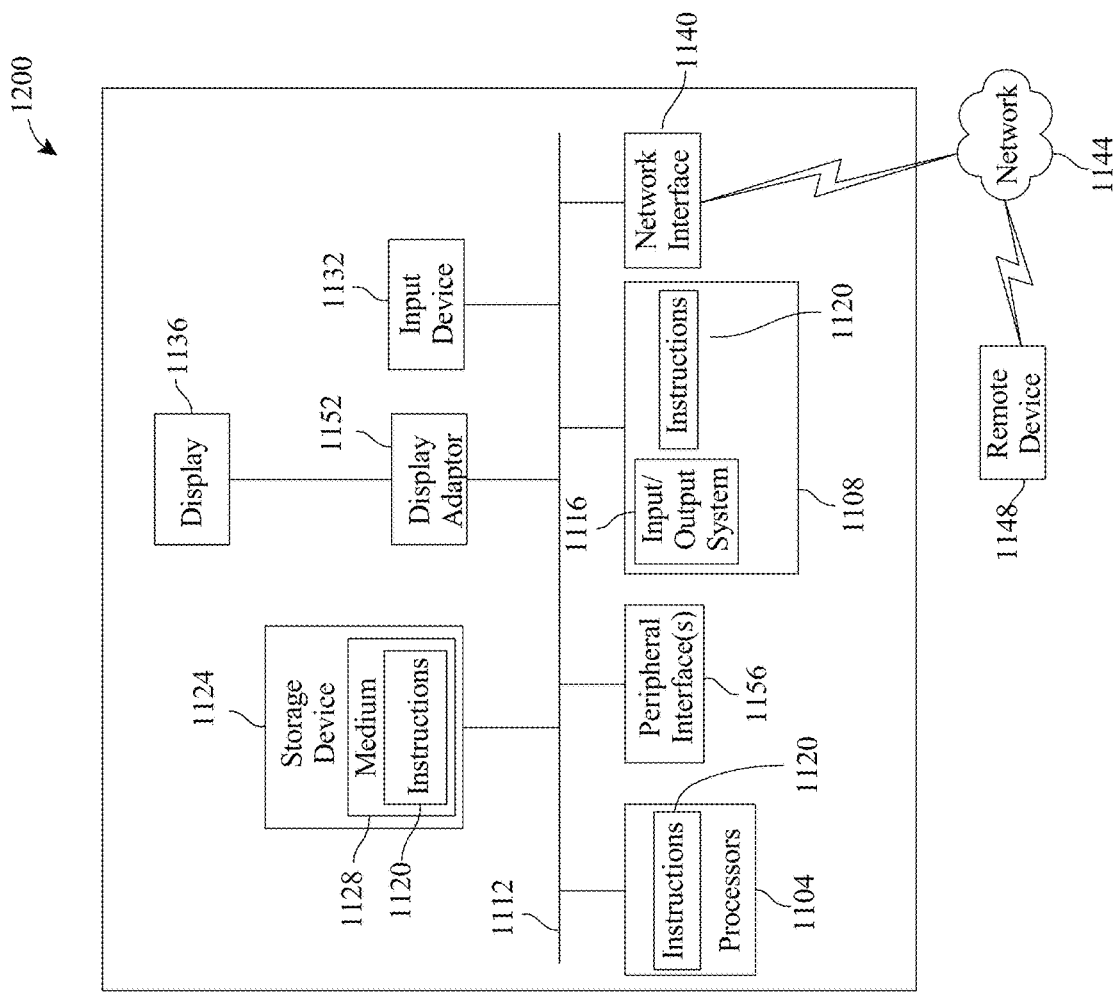
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system, such as the integrated electric propulsion assembly 500 system of FIG. 5, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1194 (FIREWIRE), and any combinations thereof. In one example, storage device 1124 (or one or more components thereof) may be removably interfaced with computer system 1100 (e.g., via an external port connector (not shown 10. Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system. 1200 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system. 1200 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An integrated stator assembly incorporated in an electric motor including a rotor that includes a plurality of rotor magnets, each rotor magnet of the plurality of magnets having a polar axis running from a rotor magnet south pole to a rotor magnet north pole, the assembly comprising:
    a mandrel of dielectric material, wherein the mandrel includes:
        a first cylindrical surface coaxial to an axis of rotation of the rotor;
        an upper edge; and
        a lower edge;
    a plurality of electrically conductive stator windings wound upon the mandrel, each winding of the plurality of windings including a plurality of turns traversing the first cylindrical surface, wherein each turn of the plurality turns further comprises:
        a first upper section disposed on the first cylindrical surface, wherein:
            the first upper section intersects the upper edge of the mandrel; and
            the first upper section forms a first angle to the axis of rotation;
        a first lower section disposed on the first cylindrical surface, wherein:
            the first lower section intersects the lower edge of the mandrel; and
            the first lower section forms a second angle to the axis of rotation; and
        a first middle section disposed on the first cylindrical surface, between the first upper section and the first lower section, wherein:

the first middle section forms a third angle with respect to the axis of rotation; and the third angle is perpendicular to each polar axis of each rotor magnet of the plurality of rotor magnets.

2. The assembly of claim 1, wherein:

the mandrel further comprises a first plurality of walls projecting from the first cylindrical surface;

the first plurality of walls form a first plurality of channels across the first cylindrical surface; and the plurality turns are channeled in the plurality of channels.

3. The assembly of claim 2, wherein the plurality of walls further comprises a plurality of retention tabs projecting over the first plurality of channels.

4. The assembly of claim 1, wherein:

the mandrel further comprises a second cylindrical surface coaxial to the axis of rotation; and the second cylindrical surface is opposite the first cylindrical surface.

5. The assembly of claim 4, wherein each turn of the plurality of turns further comprise:

a second upper section disposed on the second cylindrical surface, wherein:

the second upper section intersects the upper edge of the mandrel; and the second upper section forms a fourth angle to the axis of rotation;

a second lower section disposed on the second cylindrical surface, wherein:

the second lower section intersects the lower edge of the mandrel; and the second lower section forms a fifth angle to the axis of rotation; and a second middle section disposed on the second cylindrical surface, between the upper section and the lower section, wherein:

the middle section forms a sixth angle with respect to the axis of rotation; and the sixth angle is perpendicular to each polar axis of each rotor magnet of the plurality of rotor magnets.

6. The assembly of claim 4, wherein:

the mandrel further comprises a first plurality of walls projecting from the first cylindrical surface, wherein:

the first plurality of walls form a plurality of channels across the first cylindrical surface; and the plurality turns are channeled in the plurality of channels;

the mandrel further comprises a second plurality of walls projecting from the second cylindrical surface, wherein:

the second plurality of walls form a second plurality of channels across the first cylindrical surface; and the plurality of turns are channeled in the second plurality of channels.

7. The assembly of claim 6, wherein the second plurality of walls further comprises a plurality of retention tabs projecting over the second plurality of channels.

8. The assembly of claim 6, wherein the plurality of first channels connect to the plurality of second channels at the upper edge and the lower edge.

9. The assembly of claim 6 further comprising a plurality of projecting tabs extending beyond the upper edge and the lower edge, the plurality of projecting tabs connecting the first plurality of walls to the second plurality of walls.

10. The assembly of claim 6, wherein:

the mandrel includes a through-hole passing from the first cylindrical surface to the second surface; and the through-hole connects a channel of the first plurality of channels to a channel of the second plurality of channels.

11. The assembly of claim 1, wherein the mandrel includes:

a first mandrel half having a first end and a second end; and a second mandrel half having a third end and a fourth end.

12. The assembly of claim 11, wherein the plurality of windings includes a first winding on the first mandrel half and a second winding around the second mandrel half.

13. The assembly of claim 12, wherein the first winding includes a first phase that traverses a first set of channels from the first end, passes through a through-hole at the second end, and traverses a second set of channels back to the first end.

14. The assembly of claim 13, wherein the first phase further passes through a second through hole at the first end, traverses a third set of channels to the second end, passes through a third hole at the second end, and traverses a fourth set of channels back to the first end.

15. The assembly of claim 13, wherein the first winding includes at least a second phase electrically isolated from the first phase.

16. The assembly of claim 12, wherein the first winding is connected to at least a first inverter.

17. The assembly of claim 12, wherein the second winding includes a third phase that traverses a fifth set of channels from the fourth end to a fourth through-hole at the third end, and traverses a sixth set of channels back to the fourth end.

18. The assembly of claim 17, wherein the third phase passes through a fifth through hole at the fourth end, traverses a seventh set of channels to the second end, passes through a sixth through-hole at the third end, and traverses an eighth set of channels back to the fourth end.

19. The assembly of claim 12, wherein the a second winding includes at least a fourth phase electrically isolated from the first phase.

20. The assembly of claim 12, wherein the second winding is connected to at least a second inverter.

* * * * *